United States Patent Office 3,341,572
Patented Sept. 12, 1967

3,341,572
BASIC THYMOL N-ETHYL-N-BETAHALOETHYL-AMINOETHYL ETHERS
Hermann Engelhard, Gottingen, Gerhard Renwanz, Berlin-Tegel, Karl Credner, Berlin-Frohnau, and Berthold Geisel, Berlin-Spandau, Germany, assignors to Warner-Lambert Pharmaceutical Company, Morris Plains, N.J., a corporation of Delaware
No Drawing. Filed May 26, 1965, Ser. No. 461,225
6 Claims. (Cl. 260—479)

This application is a continuation-in-part of application Ser. No. 209,255, filed July 11, 1962, now abandoned.

This invention relates to a process for the production of basic thymyl ethers.

German patent specification No. 905,738 describes thymyl-dimethylaminoethyl ethers with a substituent in the p-position to the dimethylaminoethyl group in the thymol radical. The pharmacological action of these ethers is to weaken the adrenalin and noradrenalin effect. With cats and dogs, the effective dose is within the range of 5 to 10 mg./kg. The effective period is 60 to 90 minutes.

It has now been found that the replacement of the N,N-dimethylamino group in compounds of the type described in German Patent 905,738 by the N-alkyl-N-β-(chloro, bromo, iodo)-ethyl group leads to compounds with an increased pharmacological effect. The sympatholytic-adrenolytic properties are essentially strengthened. Doses of 0.5 mg./kg. already produce on the blood pressure of a cat an adrenalin reversal or a weakening or cancelling out of the presoric noradrenalin effect. The effective period is increased to 8 or more hours.

The intensified sympatholysis, extended as a function of time, is a technical advance in the therapy of hypertonia and of disturbances in the peripheral blood flow.

It is, therefore, an object of the present invention to provide novel basic thymyl ethers showing improved pharmacological properties.

Another object of the invention is to provide a process for the production of the novel basic thymyl ethers.

Accordingly, the invention provides basic thymyl ethers of the general formula

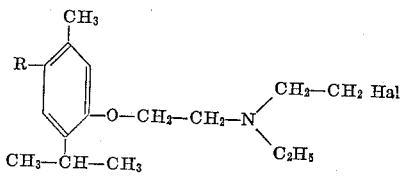

in which R represents a substituent selected from the group consisting of hydroxy, alkoxy, acyloxy, amino and acylamino radicals and halogen. Hal represents chlorine, bromine, or iodine. The ethers can be obtained by reacting thymyl-β-haloethyl ethers substituted in the 4-position with ethylamino ethanol and thereafter hydro-halogenation with thionyl chloride or thionyl bromide according to

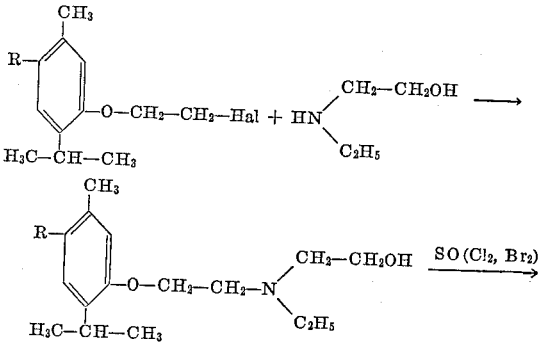

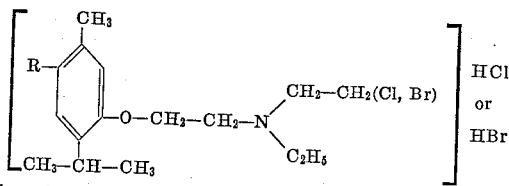

In the aforementioned equations, R and Hal have the meaning already mentioned. The condensation of the reactants is advantageously carried out by heating for a relatively long time in the presence of an acid-combining agent. Potash or also excess amine are for example such an acid-combining agent. The reaction can be carried out in the presence of solvents and suitable solvents are for example alcohol or toluene.

The hydrochlorination with thionyl chloride or bromide can be carried out without or in the presence of inert solvents, for example, benzene or chloroform. It is desirable to avoid relatively large excesses of thionyl compound and high temperatures in order to prevent resinification.

According to one preferred feature of the invention, the β-bromethyl compounds are obtained from the β-chlorethyl compounds by boiling with sodium bromide in alcohol or with lithium bromide in acetone. The β-iodethyl compounds are obtained from the chlorethyl compounds by reaction with sodium iodide in absolute alcoholic or acetonic solution.

The new compounds are also formed as secondary products with the reaction of 4-substituted thymols with bis-(β-chlorethyl)-ethyl amine and sodium alcoholate, which leads predominantly to the bis-(thymoxyethyl)-ethyl amines.

The hydrochlorides of the novel bases are usually capable of crystallization and have a satisfactory to good solubility in water and alcohols, and frequently in a surprising manner also in benzene and acetic ester. They can as required be converted in conventional manner into salts of other acids, for example, of perchloric acid, hydrobromic acid, sulphuric acid, 1,5-naphthalene disulphonic acid, oxalic acid, maleic acid, for example by liberation of the organic base with alkalis, taking up in ether and the like and neutralizing with the required acid or (depending on the solubility conditions) by reacting the hydrochloride with the alkali or silver salt of the required acid.

Salts of 4-chlorothyml-(N-ethyl-N-β-bromethylaminoethyl)-ether have particularly advantageous properties with respect to tissue compatibility and toxicity, combined with a peroral efficacy.

The invention is further illustrated by the following examples.

EXAMPLE 1

11.7 g. of (4-acetaminothymyl)-(β-chlorethyl)-ether are heated with an equal quantity of ethyl-β-hydroxyethylamine for 4 hours to 120° C. After the reaction mixture has cooled, about 30 ml. of water and 20 ml. of concentrated hydrochloric acid are added thereto and the mixture is then once again heated for 1 hour under reflux. After repeated cooling, the acid solution is neutralized with alkali, active carbon is added thereto and then it is filtered. The filtrate is made alkaline with potash and it is extracted by shaking with acetic ester. The ester extract is adjusted with acetic ester-hydrogen chloride solution to a pH-value of 5. About 10.7 g. of (4-aminothymyl)-(N-ethyl-N-β-hydroxyethylaminoethyl)-ether dihydrochloride crystallize out as a light violet powder which is soluble in water and alcohols and has a melting point of from 218 to 221° C. (with decomposition).

10 g. of this compound, with a solution of about 30 ml. of thionyl chloride and 60 ml. of benzene, are kept for 20 minutes at about 60° C. The reaction product is concentrated by evaporation in vacuo and dissolved in about 7 times the quantity of twice-normal hydrochloric acid. The solution is filtered through active carbon and the filtrate is evaporated to dryness in vacuo. The residue is dissolved and reprecipitated from methanol-acetic ester, is initially of an oily nature and crystallizes in the desiccator over phosphorus pentoxide.

About 6.3 g. of (4-aminothymyl)-(N-ethyl-N-β-chlorethylaminoethyl)ether dihydrochloride are obtained as a yellowish, hydroscopic powder which is soluble in water and alcohols and insoluble in acetic ester and ethers, the melting point of the powder being 130 to 135° C. (with decomposition).

By diazotization, concentration by boiling and acetylation, (4-acetoxythymyl)-(N-ethyl-N-β-chloroethylaminoethyl)-ether monomydrochloride is obtained therefrom as a practically white powder which is soluble in water, alcohols and benzene and insoluble in ether and petroleum ether, the melting point of the powder being 105 to 107° C.

EXAMPLE 2

With the reaction of 4-chlorothymyl-β-chlorethylether with ethyl-β-hydroxyethylamine in the manner described in Example 1 (omitting only the saponification with hydrochloric acid), there is obtained the (4-chlorothymyl)-(N-ethyl-N-β-hydroxyethylaminoethyl) - ether monohydrochloride, M.P. 143 to 144° C., as a white powder which is soluble in water and alcohols and insoluble in ether and cold acetic ester, and this powder, on being treated with thionyl chloride, produces (4-chlorothymyl)-(N-ethyl-N-β-chlorethylaminoethyl) - ether monohydrochloride with a melting point of 126 to 127° C., this monohydrochloride being soluble in water, alcohols, benzene and acetic ester but insoluble in ether and petroleum ether.

EXAMPLE 3

With the use of 4-bromothymyl-β-chlorethyl-ether instead of the chlorothymyl compound mentioned in Example 2, there is formed the (4-bromothymyl)-(N-ethyl-N-β - chlorethylaminoethyl) - ether monohydrochloride, M.P. 126 to 127° C., which is soluble in water, alcohols, benzene and acetic ester but insoluble in ether and petroleum ether.

EXAMPLE 4

(4-chlorothymyl) - (N - ethyl-N - β-bromethylaminoethyl)-ether monohydrobromide is formed (a) by reacting the (4-chlorothymyl)-(N-ethyl-N-β-hydroxyethyl-aminoethyl)-ether prepared according to Example 2 with thionyl bromide in solution in benzene, (b) by boiling an alcoholic or acetonic solution of (4-chlorothymyl)-(N-ethyl-N - β - chlorethylaminoethyl)-ether monohydrochloride for several hours with the equivalent quantity of sodium bromide or lithium bromide, the said substance constituting a white powder with a melting point of 121–122° C., which is soluble in alcohols, acetic ester and benzene and practically insoluble in ether, petroleum ether and water.

EXAMPLE 5

(4-chlorothymyl) - (N-ethyl-N-β-iodethylaminoethyl) ether monohydroiodide is formed from the chlorethyl compound described in Example 2 by being heated for about 2 hours with acetonic or alcoholic sodium iodide solution, the said substance constituting a yellowish powder with a melting point of 140–141° C., which is soluble in alcohols but is not soluble or is sparingly soluble in water, ether and petroleum ether.

As used in the present application, the term halogen is intended to mean the radicals of bromine, fluorine, chlorine and iodine. The term alkoxy is intended to mean those alkoxy radicals having from 1 to 6 carbon atoms in each group while the term acyl includes from 2 to 6 carbon atoms per group.

It is understood that the foregoing detailed description is given merely by way of illustration and that many variations may be made therein without departing from the spirit of this invention.

What is claimed is:
1. (4-aminothymyl) - (N-ethyl-N-β - chlorethylaminoethyl)ether dihydrochloride.
2. (4-acetoxythymyl) - (N-ethyl - N - β - chlorethylaminoethyl)ether monohydrochloride.
3. (4-chlorothymyl) - (N - ethyl - N - β - chlorethylaminoethyl)ether monohydrochloride.
4. (4-bromothymyl) - (N - ethyl - N - β - chlorethylaminoethyl)ether monohydrochloride.
5. (4-chlorothymyl) - (N - ethyl - N - β - bromethylaminoethyl)ether monohydrobromide.
6. (4-chlorothymyl) - (N - ethyl - N - β - iodethylaminoethyl)ether monohydroiodide.

References Cited

UNITED STATES PATENTS

| | | | |
|---|---|---|---|
| 1,949,046 | 2/1934 | Hartmann et al. | 260—570.7 |
| 2,599,001 | 6/1952 | Kerwin et al. | 260—570.7 |
| 2,688,638 | 9/1954 | Gump et al. | 260—570.7 |

OTHER REFERENCES

Nickerson et al.: "Jour. Pharmacology and Experimental Therapeutics," vol. 101, pages 379–96 (1951).

Wagner et al.: Synthetic Organic Chemistry, pages 93–94 (1953).

LORRAINE A. WEINBERGER, *Primary Examiner.*

V. GARNER, *Assistant Examiner.*